(12) United States Patent
Giles et al.

(10) Patent No.: US 10,697,675 B2
(45) Date of Patent: *Jun. 30, 2020

(54) REVERSING VALVE

(71) Applicant: Lennox Industries Inc., Richardson, TX (US)

(72) Inventors: Eric Giles, Royse City, TX (US); Chris McHugh, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/027,476

(22) Filed: Jul. 5, 2018

(65) Prior Publication Data

US 2018/0313590 A1  Nov. 1, 2018

Related U.S. Application Data

(63) Continuation of application No. 13/428,443, filed on Mar. 23, 2012, now Pat. No. 10,018,387.

(51) Int. Cl.
*F16K 11/052* (2006.01)
*F25B 41/04* (2006.01)
*F25B 13/00* (2006.01)

(52) U.S. Cl.
CPC ........ *F25B 41/046* (2013.01); *F16K 11/0525* (2013.01); *F25B 13/00* (2013.01); *Y10T 29/49405* (2015.01); *Y10T 137/86839* (2015.04)

(58) Field of Classification Search
CPC .... F16K 11/0525; F16K 31/06; F16K 11/074; F16K 31/082; F25B 41/046; Y10T 137/86839; Y10T 29/49405; Y10T 137/86863; F02M 26/70

See application file for complete search history.

(56) References Cited

U.S. PATENT DOCUMENTS

| | | | |
|---|---|---|---|
| 3,299,662 A | 1/1967 | Harnish | |
| 3,987,642 A | 10/1976 | Portoso et al. | |
| 4,108,206 A | 8/1978 | Mountain | |
| 4,203,469 A | 5/1980 | Gates | |
| 4,240,469 A * | 12/1980 | Bauer | F16K 11/065 137/625.25 |
| 4,381,798 A * | 5/1983 | Tobin | F16K 11/074 137/625.43 |
| 4,406,306 A * | 9/1983 | Kolze | F16K 11/24 137/625.43 |
| 4,739,796 A * | 4/1988 | Harding | F16K 11/0525 137/584 |
| 4,807,665 A * | 2/1989 | Schiel | F16K 11/0525 137/625.4 |

(Continued)

FOREIGN PATENT DOCUMENTS

EP 1471316 A1 * 10/2004 .......... F16K 11/0525

*Primary Examiner* — Frantz F Jules
*Assistant Examiner* — Martha Tadesse
(74) *Attorney, Agent, or Firm* — Winstead PC

(57) ABSTRACT

A reversing valve comprising a valve body having an internal cavity therein and an input port, output port and first and second reversing ports. A baffle is located within the internal cavity and is configured to rotate around a pivot point within the internal cavity. At least one electromagnet is coupled to the valve body. The electromagnet is configured to cause the baffle to rotate in one of the clockwise direction or counter-clock wise direction when a voltage is applied to the electromagnet.

14 Claims, 10 Drawing Sheets

(56) References Cited

U.S. PATENT DOCUMENTS

| | | | |
|---|---|---|---|
| 4,825,908 A * | 5/1989 | Tsuchihashi | F25B 41/046 137/625.43 |
| 5,295,659 A | 3/1994 | Steele | |
| 5,687,764 A * | 11/1997 | Tanaka | F16K 11/0525 137/625.43 |
| 5,690,144 A * | 11/1997 | Takahashi | F25B 41/046 137/625.43 |
| 5,911,242 A * | 6/1999 | Parker | F16K 11/0743 137/625.43 |
| 6,076,553 A * | 6/2000 | Sugita | F16K 11/0743 137/625.43 |
| 6,234,207 B1 * | 5/2001 | Toyama | F16K 11/074 137/625.43 |
| 6,295,828 B1 * | 10/2001 | Koo | F16K 11/0525 137/625.29 |
| 6,505,647 B2 * | 1/2003 | Sasada | F16K 11/0743 137/625.43 |
| 7,491,037 B2 * | 2/2009 | Edwards | F01C 21/0836 417/315 |
| 7,510,545 B2 * | 3/2009 | Peppel | A61M 39/045 604/256 |
| 9,074,522 B2 * | 7/2015 | Scholt | F02B 33/00 |
| 2002/0005221 A1 * | 1/2002 | Sisk | F16K 11/0853 137/625.43 |
| 2004/0007008 A1 * | 1/2004 | Benatav | F25B 41/046 62/324.6 |
| 2006/0037654 A1 * | 2/2006 | Moreno | F16K 11/074 137/625.43 |
| 2008/0308079 A1 * | 12/2008 | Albert | F16K 3/10 123/568.11 |
| 2010/0269529 A1 * | 10/2010 | Han | B60H 1/00485 62/244 |
| 2011/0081277 A1 * | 4/2011 | Balon, Jr. | B01D 53/72 422/175 |
| 2011/0100041 A1 * | 5/2011 | Crawford | F25B 13/00 62/156 |

* cited by examiner

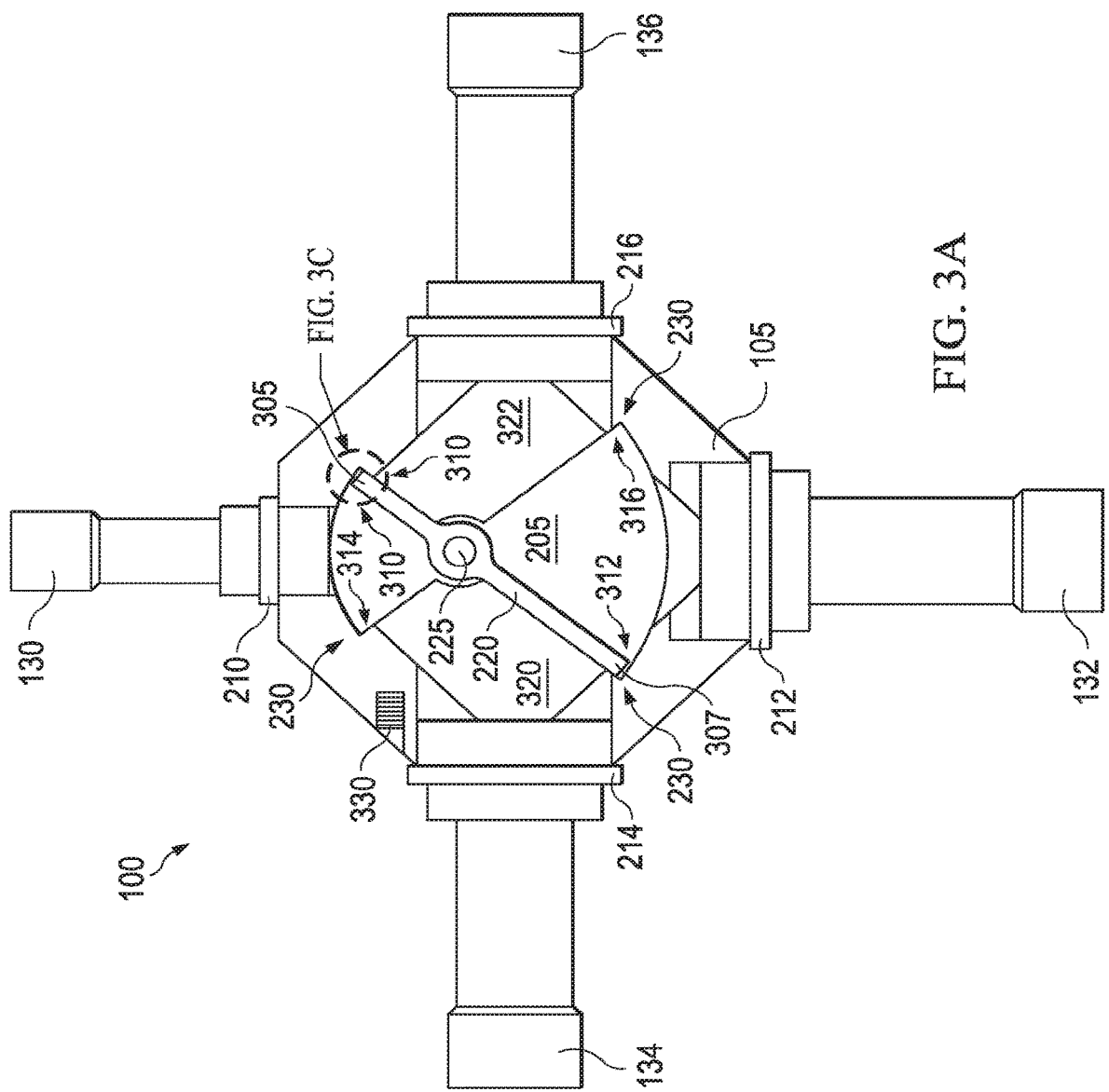

REVERSING VALVE

CROSS-REFERENCE TO RELATED APPLICATION

This application is a continuation of U.S. patent application Ser. No. 13/428,443, filed on Mar. 23, 2012. U.S. patent application Ser. No. 13/428,443 is incorporated herein by reference.

TECHNICAL FIELD

This application is directed, in general, to space conditional apparatuses and, more specifically, to a reversing valve, and to a method of manufacturing thereof.

BACKGROUND

A reversing valve is often used in heat pumps to facilitate the changing the direction of refrigerant flow and thereby change the heat pump's refrigeration mode between cooling and heating. Typically the reversing valve includes or is coupled to a solenoid that when energized, causes the refrigerant to flow in one direction, and when de-energized, cause the refrigerant to flow in another direction.

SUMMARY

One embodiment of the present disclosure is a reversing valve. The valve comprises a valve body having an internal cavity therein and an input port, output port and first and second reversing ports, wherein the input port, the output port and the first and second reversing ports are all in fluid communication with the internal cavity. The valve also comprises a baffle located within the internal cavity. The baffle is configured to rotate around a pivot point within the internal cavity. Ends of the baffle contact interior walls of the value body when the baffle rotates about the pivot point in a clockwise direction, thereby isolating the input port and first reversing port and volume of the internal cavity there-between, from the output port and second reversing port and different volume of the internal cavity there-between. The ends of the baffle contact different interior walls of the value body when the baffle rotates about the pivot point in a counter-clock wise direction, thereby isolating the input port and the second reversing port and second volume of the internal cavity there-between from the output port and the first reversing port and second different volume of the internal cavity there-between. The value also comprises at least one electromagnet coupled to the valve body. The electromagnet is configured to cause the baffle to rotate in one of the clockwise direction or counter-clock wise direction when a voltage is applied to the electromagnet.

Another embodiment of the discloser is a heat pump system. The system comprises an indoor heat exchanger, an outdoor heat exchanger, a compressor and the above-described reversing valve. The compressor is configured to compress a refrigerant and configured to transfer the refrigerant to a discharge line of the system and to receive the refrigerant from a suction line of the system. The input port is coupled to the discharge line, the output port is coupled to the suction line, the first reversing port is coupled to a transfer line connected to the outdoor heat exchanger, and the second reversing port is coupled to a second transfer line connected the indoor heat exchanger.

Another embodiment is method of manufacturing a reversing valve. The method comprises providing a valve body having an internal cavity therein and an input port, output port and first and second reversing ports, wherein the input port, the output port and the first and second reversing ports are all in fluid communication with the internal cavity. The method also comprises providing a providing a baffle configured to fit within the internal cavity. The baffle is provided such that baffle is configured to rotate around a pivot point within the internal cavity. Ends of the baffle contact interior walls of the value body when the baffle rotates about the pivot point in a clockwise direction, thereby isolating the input port and first reversing port and volume of the internal cavity there-between, from the output port and second reversing port and different volume of the internal cavity there-between. The ends of the baffle contact different interior walls of the value body when the baffle rotates about the pivot point in a counter-clock wise direction, thereby isolating the input port and the second reversing port and second volume of the internal cavity there-between from the output port and the first reversing port and second different volume of the internal cavity there-between.

The method further comprises coupling at least one electromagnet to the valve body, wherein the electromagnet is configured to cause the baffle to rotate in one of the clockwise direction or counter-clock wise direction when a voltage is applied to the electromagnet.

BRIEF DESCRIPTION OF THE DRAWINGS

Reference is now made to the following descriptions taken in conjunction with the accompanying drawings, in which:

FIG. 3A shows a plan view of an example reversing valve of the disclosure, similar to the example embodiments depicted in FIGS. 1 and 2, with full clockwise baffle rotation;

DETAILED DESCRIPTION

The term. "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the present disclosure benefit from the recognition that some reserving valve designs rely on the combination of moving a sliding assembly by an energizing (or de-energizing) a solenoid which causes an applied pressure from refrigerant through pressure ports to push sliding component, and thereby accomplish a change in direction of refrigerant flow through the valve. It was recognized as part of the present disclosure, that an industry-wide trend towards using low-speed and low-pressure compressors, reduces the reliably of such valve designs. For instance, when the applied pressure from refrigerant flowing into the valve is reduced, the sliding assembly can become stuck in-between fully actuated states, corresponding to a partial change in the direction of refrigerant flow. Consequently, the efficiency of the cooling mode or heating mode of the heat pump can be compromised.

Embodiments of the present disclosure address this problem by providing a reversing valve that can cause full valve actuation by applying an electromagnetic force that causes an internal baffle to rotate to facilitate the change in direction of refrigerant flow through the valve. Reversing valve embodiments of the disclosure can fully actuate without relying upon having a high pressure of inflowing refrigerant, or in some cases, any refrigerant pressure whatsoever.

Certain reversing valve embodiments of the disclosure can also have a number of additional unexpected beneficial features that were not present in other valve designs. Because high-pressures of refrigerant flowing through the value are not required for valve actuation, there is less acoustical noise associated with actuation. There is no longer a need to use a sliding assembly, or the small diameter pressure port tubing to push the sliding assembly. The elimination of the small diameter pressure port tubing, in turn, eliminates the possibility of the tubing getting clogged up with debris (e.g., solder flakes, or compressor shavings) and thereby causing a valve malfunction. The choice of the material that the baffle is composed of can facilitate less heat transfer across the baffle and hence more efficient operation of the heat pump. Certain embodiments of the disclosed reversing valve can have well-separated inlet, outlet and reversing port locations as part of the valve body, which in turn, facilitates in-field replacement of the valve.

Figure 1:
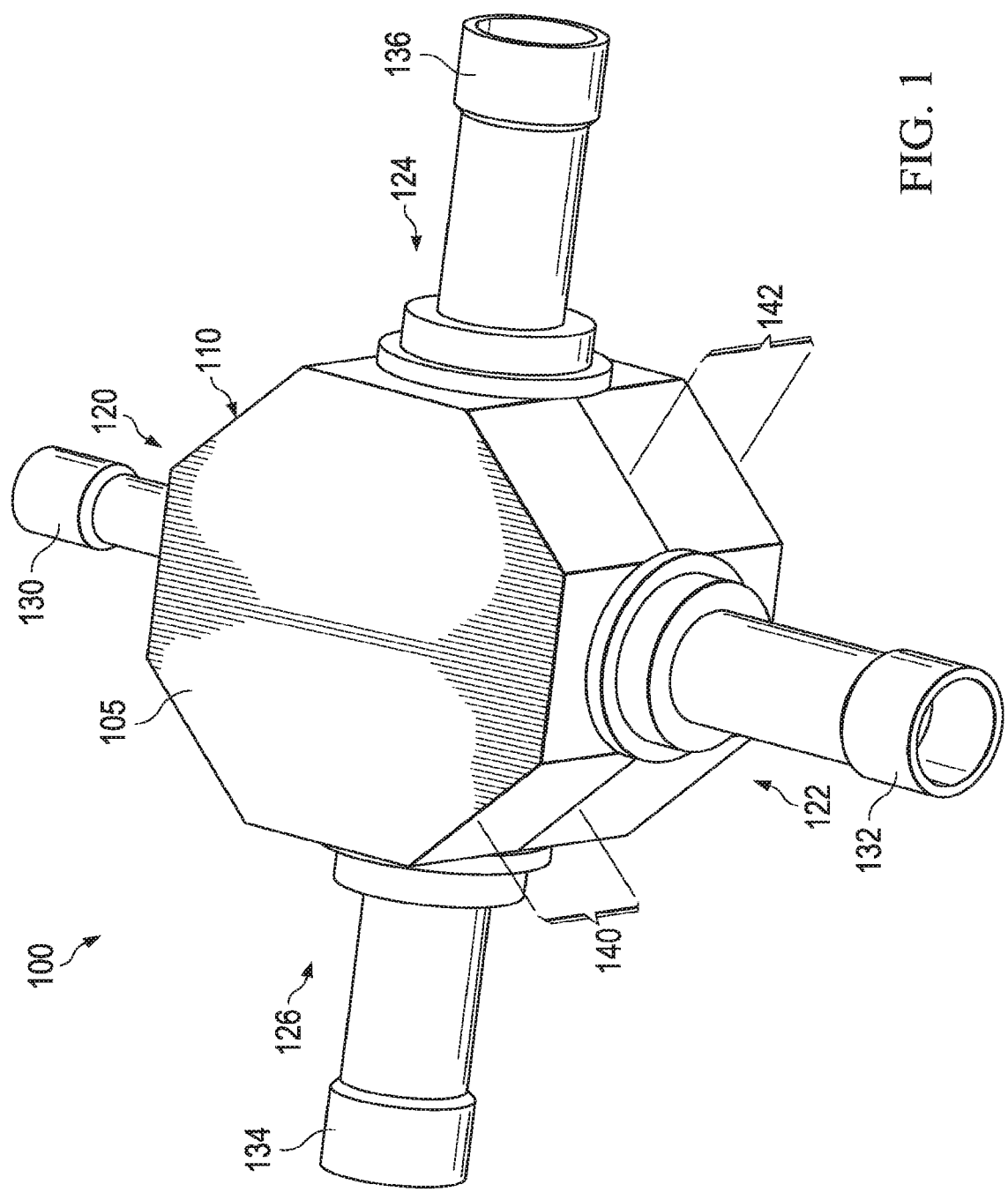
FIG. 1 presents a perspective view of an example reversing valve of the disclosure.
Figure 2:
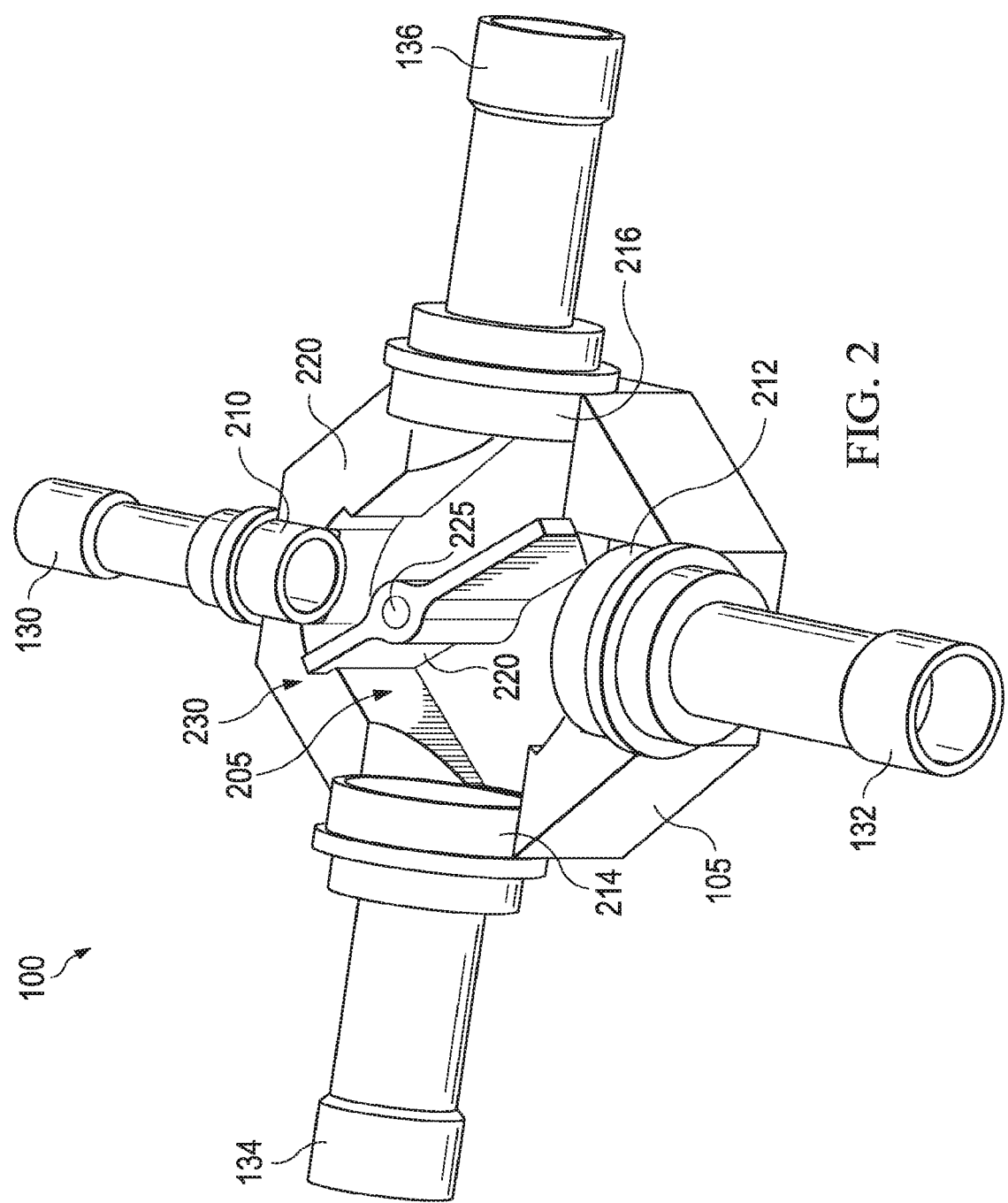
FIG. 2 presents a perspective view of an example reversing valve of the disclosure, similar to the example embodiment showed in FIG. 1 except with some parts of the valve body not show so that some internal features are visible.
Figure 3B:
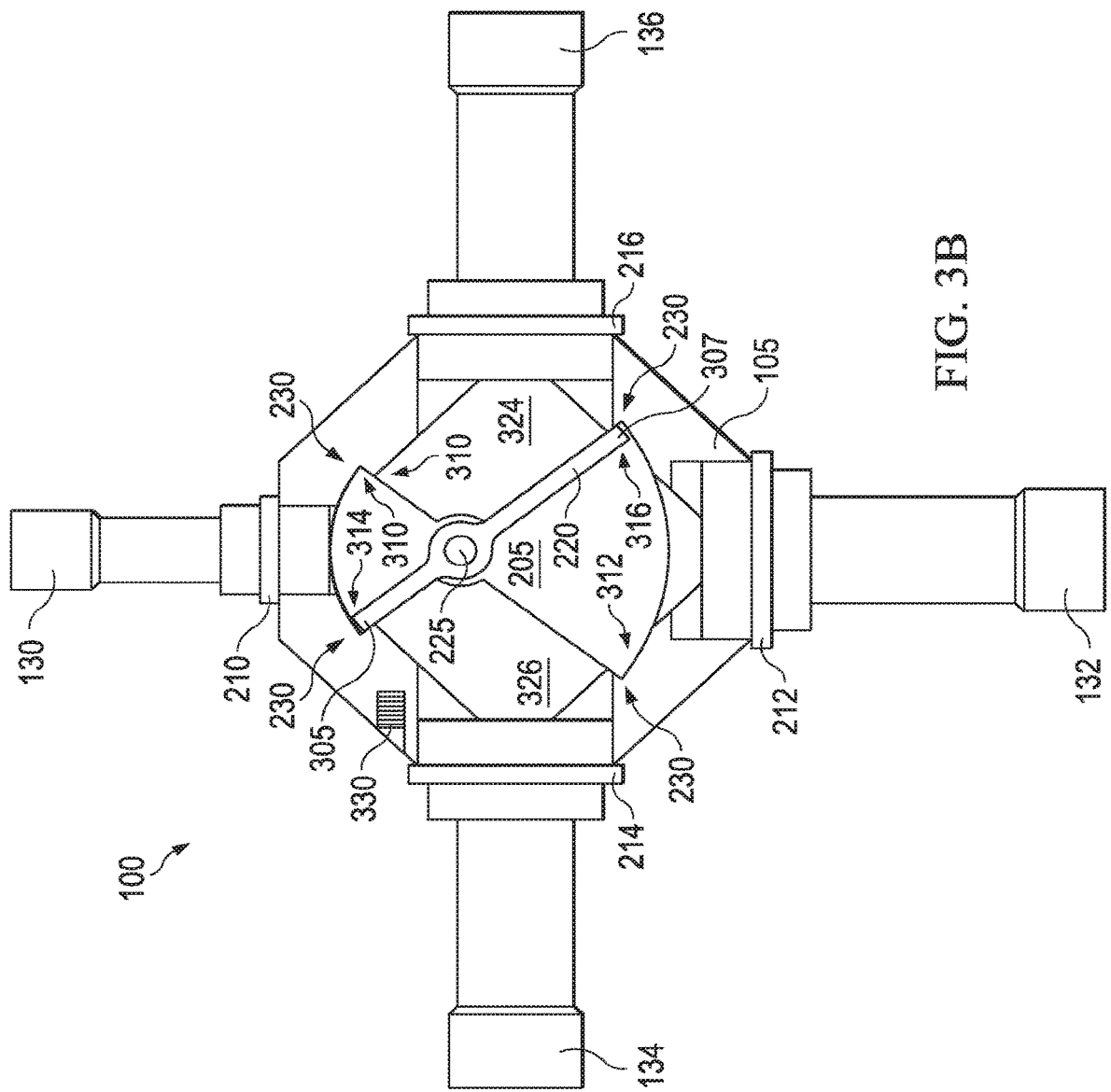
FIG. 3B shows a plan view of an example reversing valve of the disclosure, similar to the example embodiments depicted in FIGS. 1 and 2, with full counter-clockwise baffle rotation.

One embodiment of the present disclosure is a reversing valve 100 such as depicted in FIGS. 1-3B. FIG. 1 presents a perspective view of an example reversing valve 100 of the disclosure and shows a similar perspective view an example reversing valve 100 except with some parts of a valve body not show so that some internal features are visible. FIGS. 3A and 3B show plan views of an example reversing valve 100 of the disclosure, similar to the example embodiments depicted in FIGS. 1 and 2 with full clockwise and counter-wise baffle rotation respectively, and FIG. 3C shows a detailed view of a portion of the reversing valve 100 shown in FIG. 3A.

With continuing reference to FIGS. 1-3C throughout, the reversing valve 100 comprises a valve body 105. The valve body 105 has an internal cavity 205 therein, and, an input port 210, output port 212 and first and second reversing ports 214, 216. The input port 210, the output port 212 and the first and second reversing ports 214, 216 are all in fluid communication with the internal cavity 205.

The reversing valve 100 also comprises a baffle 220 located within the internal cavity 205. The baffle 220 is configured to rotate around a pivot point 225 within the internal cavity 205. Ends 305, 307 of the baffle 220 contact interior walls 310, 312 of the value body 105 when the baffle rotates about the pivot point 225 in a clockwise direction (FIG. 3A), thereby isolating the input port 210 and first reversing port 214 and volume 320 of the internal cavity 205 there-between, from the output port 212 and second reversing port 216 and different volume 322 of the internal cavity 205 there-between. For example, when rotated in the clockwise direction, the ends 305, 307 of the baffle 220 sweep past the input port 210 and output port 212, respectively.

The ends 305, 307 of the baffle 220 contact different interior walls 314, 316 of the value body 105 when the baffle 220 rotates about the pivot point 225 in a counter-clock wise direction (FIG. 3B), thereby isolating the input port 210 and the second reversing port 216 and second volume 324 of the internal cavity 205 there-between from the output port 212 and the first reversing port 214 and second different volume 326 of the internal cavity 205 there-between. For example, when rotated in the counter-clockwise direction, the ends 305, 307 of the baffle 220 sweep past the input port 210 and output port 212, respectively.

The reversing valve 100 also comprises at least one electromagnet 330 coupled to the valve body 105. In some cases the electromagnet is embedded in the valve body 105 such as depicted in FIGS. 3A and 3B, while in other cases the electromagnet can be coupled to the outer surface 110 of the valve body 105. The electromagnet 330 is configured to cause the baffle 220 to rotate in one of the clockwise direction or counter-clock wise direction when a voltage is applied to the electromagnet 330. For example, in some embodiments, the electromagnet 330 includes a solenoid that is configured to receive about 24 volts to activate the electromagnet 330 and generate a magnetic field that causes the baffle 220 to rotate. One skilled in the art would be familiar with the other types of electromagnets configurations and voltages that could be applied to achieve the desired rotation.

The example valve body 105 depicted in FIG. 1 has an octagonal shape in the plan view dimension, and this shape can facilitate locating ports of the body on planar symmetrically spaced planar surfaces 110 of the body 105. However, other embodiments of the body 105 could have other shapes, such as, but not limited to, cylindrical, cubic, rectangular prism, parallelapiped shapes or irregular shapes.

As further illustrated in FIGS. 1-3B, in some embodiments, the input and output ports 210, 212 are located on opposing sides 120, 122 of the valve body 105 and the first and second reversing ports 214, 216 are located on different opposing sides 124, 126 of the valve body 105. Such a symmetric spacing of the ports 210, 212, 214, 216 can improve access to refrigerant transfer lines, 130, 132, 134, 136, respectively coupled to the individual ports 210, 212, 214, 216. Improved individual access to the lines. 130, 132, 134, 136, in turn can facilitate field installation or replacement of the reversing valve 100, e.g., by making it easier to solder or de-solder an individual tube from a port of the valve 100.

As also illustrated in FIGS. 1-3B, in some embodiments, the ports 210-216 are all in a common plane. Such a configuration can be conducive to keeping the ports 210-216 and tubing 130-136 connected thereto, well-separated while also minimizing the total volume occupied by the valve 100, e.g., by minimizing the valve structures or coupled lines in the space above an below the common plane. Such a configuration can facilitate installing the valve 100 in proximity to other components of a space conditional system (e.g., a heat pump system) that the valve 100 is part of. However in other embodiments of the valve 100, one or more of the ports 210-216 can be on a same side 120-126, or, not all in a common plane, or the valve 100 can include additional input, output or reversing ports.

As illustrated in FIGS. 2 and 3A-3C, in some embodiments of the valve 100, one or more of the interior walls 310-316 can include recesses 230. Each recess 230 is configured such that a portion 330 of a major surface 335 of the baffle 220 near one of the ends 305 of the baffle 220 contacts the recessed portion 230 of one of the interior walls 310. Configuring the recess 230 to allow the major surface 335 to contact the interior walls improving the fluid seal between the baffle 220 and the interior wall 310 so as to better isolate the different volumes 320, 322 of the chamber 105.

Figure 3C:
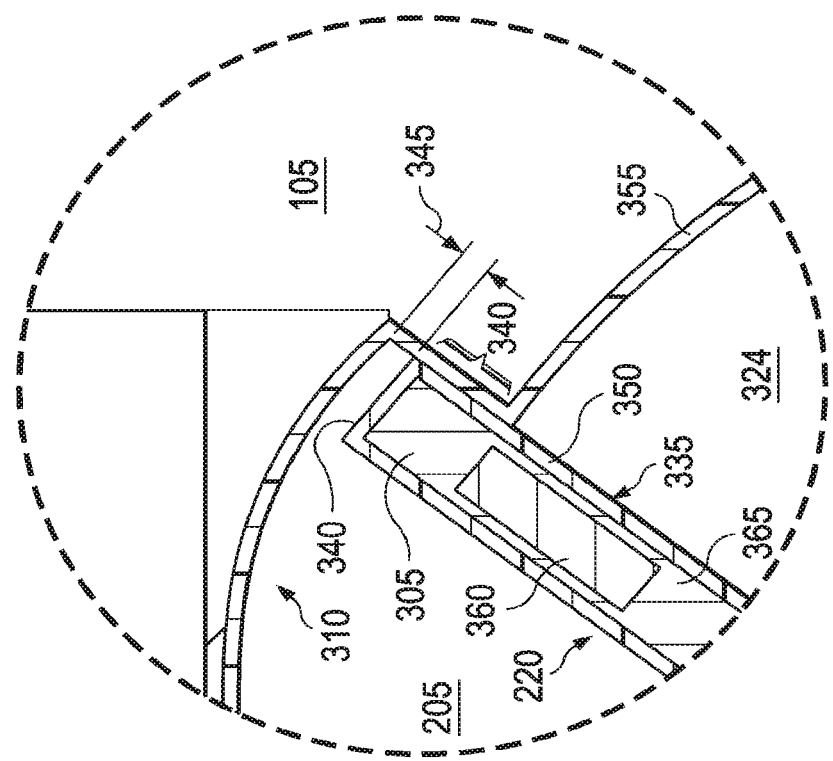
FIG. 3C shows a detailed view of a portion of the reversing valve 100 shown in FIG. 3A.

As further illustrated in FIG. 3C, to facilitate improving the fluid seal between the baffle 220 and the interior wall 310, some embodiments of the baffle 220 and internal chamber 205 are shaped (e.g., via bending, milling or molding) so that the baffle edges opposing the interior wall 310 (including top, bottom and sides of the chamber 105) are in close proximity to each other. That is the outer edge 340 of the baffle 220 closely mirrors the surface contours of the internal cavity 105. For example in some embodiments, a gap distance 345 between outer edges (e.g., edge 340) of the baffle 220 and the interior walls (e.g., wall 310) is about 1/8 inch or less, and in some cases, about 1/16 inch or less.

In some embodiments, to facilitate the fluid seal between the baffle 220 and the interior wall 310, the outer edge 340 of the baffle 220 (e.g., all edges 340 of the baffle that oppose an interior wall of the chamber) remain in contact with the interior wall 310, as the baffle 220 rotates. In some such embodiments, at least the outer edge 340 of the baffle 220 is covered with a pliable material 350 that contacts the interior wall 310. The pliable material 350 can facilitate the baffle edge 340 maintaining contact with the interior wall 310 as the baffle 220 rotates, and can help mitigate wearing down of the baffle edge 340 or the interior wall 310. Non-limiting example embodiments of the pliable material 350 include Teflon, Nylon, Carbon fiber or similar pliable materials that can tolerate the high pressures and temperatures of refrigerant flowing through the value (e.g., up to about 450 psi and 220.degree. F. in some embodiments). In some embodiments, the entire baffle 220 is coated with the pliable material 350. Such embodiments can mitigate the pliable material 350 delaminating from the baffle 220, as compared to when the pliable material is 350 only along the edge 340 of the baffle 220.

In some embodiments, to facilitate the fluid seal between the baffle 220 and the interior wall 310, the internal cavity 205 of the valve body 105 is covered with a pliable material 355. For instance, as further illustrated in FIG. 3C, the interior walls (e.g., wall 310) can be coated with a pliable material 355. Any of the materials (e.g., Teflon. Nylon, Carbon Fiber) discussed in the context of the pliable material 350 can also be used as the pliable material 355 associated with the valve body 105. In some embodiments the valve body 105 can be substantially composed of the pliable material.

In some embodiments of the baffle 220, to facilitate rotation of the baffle 220 when the electromagnet 330 activated by applying the voltage, the baffle 220 is substantially composed of a ferromagnetic material. For instance, in some cases, the baffle 220 is made of entirely of a ferromagnetic material such as iron, a low grade stainless steel (e.g., grade 409 stainless steel or lower) or similar metals, or metal alloys containing ferromagnetic materials (e.g., in some cases at least about 50 percent, in some case at least about 75 percent iron, by weight).

In other cases, however, the baffle 220 is substantially composed of a non-ferromagnetic material and further includes a ferromagnetic material attached thereto. For example, in some embodiments, the baffle 220 can be composed of Teflon or Nylon and further include a strip or layer 360 of low grade stainless steel, or similar ferromagnetic material attached thereto, in some cases near the baffle's ends 305, 307.

Figure 4:
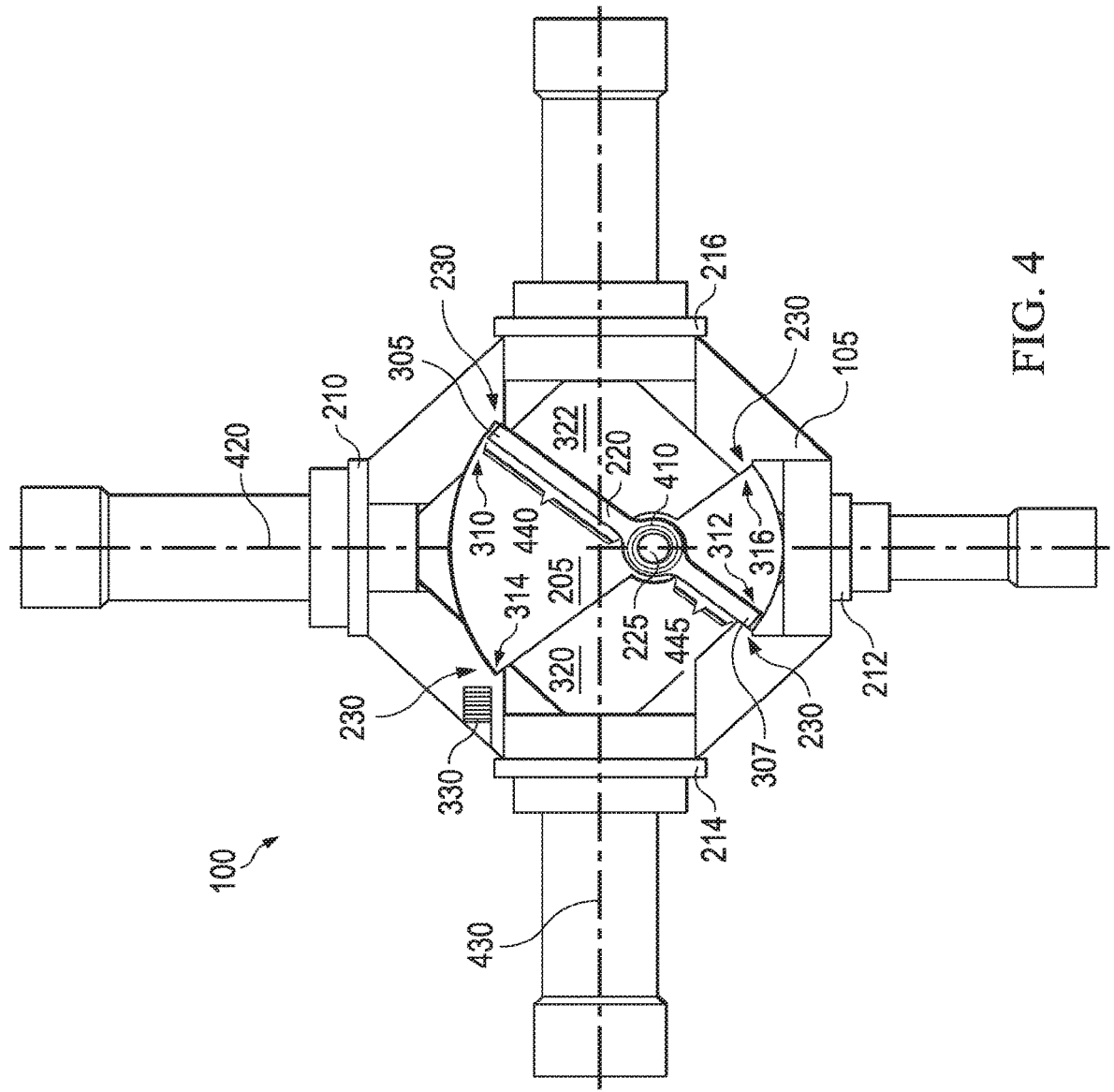
FIG. 4 shows a plan view of selected portions of another example embodiment of the reversing valve of the disclosure similar to that depicted in FIGS. 3A and 3B.

FIG. 4 shows a plan view of selected portions of another example embodiment of the reversing valve of the disclosure similar to that depicted in FIGS. 3A and 3B. As noted above, the reversing valve 100 comprises at least one electromagnet 330. In some embodiments, such as when the reversing valve 100 has only one electromagnet 330, the pivot point 225 can be connected to a spring 410. Embodiments of the spring 410, can be, or include, a spring coil, one or more torsion bars, or other spring mechanisms as familiar to those skilled in the art, capable of imparting a rotational torque on the baffle 220. The spring 410 is configured to rotate the baffle 220 to one of the clock-wise or counter clock-wise directions, and the electro-magnet 330, is configured to rotate the baffle in the opposite one of the clock-wise or counter-clock-wise directions. For instance, in the absence of the applied voltage, the spring 330 may rotate the baffle 220 fully clockwise until it is stopped by the interior wall 310 or the optional recess 230 therein. In the presence of the applied voltage, the electromagnet 330 is activated and rotates the baffle counter-clockwise until it is stopped by the interior wall 314 or other optional recess 230 therein.

As further illustrated in FIGS. 3A-3B and 4, in some embodiments the pivot point 225 is substantially offset from the center of the internal cavity 205, along a central axis (e.g., axis 420 in FIG. 4) along the input port 210 and the output port 212. In some cases, the pivot point 225 (e.g., FIG. 4), e.g., past a central axis 430 along the first and second reserving ports 214, 216 towards to output port 212, that is, nearer to the output port 212 than the input port 210, and running along the central axis 420 along the input port 210 and the output port 212. In other cases, the pivot point 225 can be closer to the input port 210 (e.g., FIG. 3A-3B). These offset locations of the pivot points 225 are not specific to the example embodiment valves 100 depicted in FIGS. 3A-4. For instance, in other cases the pivot point 225 depicted in FIG. 4 is closer to the input port 210, e.g., past a central axis 430 along the first and second reserving ports 214, 216, nearer to the input port 210 than the output port 212, and along the central axis 420 running along the input port 210 and the output port 212. In still other embodiments, however, the pivot point 225 can be centrally located in the internal cavity 205, e.g., along both of the central axes 420, 430 depicted in FIG. 4.

Off-setting the location of the pivot point 225 as discussed above can facilitate the optional use of pressure from the refrigerant running through valve 100 to help rotate the baffle 330 in a particular direction. For example, consider a state of operation of the valve 100 where the pressure from refrigerant flow at the input port 210 is substantially greater than the pressure of refrigerant flow at the output port 212 or reversing ports 214, 216. In such a state, the greater pressure from the refrigerant flow into the input port 210 will assist the rotation of the baffle by applying more torque to the larger surface area 440 of the baffle on one side of the pivot point 225 as compared to the smaller surface area 445 of the baffle on the other side of the pivot point 225. For instance, once the ends 305, 307 of the baffle 220 are rotated past the axis 420, or past the input port 210, the pressure from refrigerant flow at the input port 210 will help rotate in that same direction of rotation. In some embodiments therefore, it may not be necessary to continuously apply the voltage to the electromagnet 330 to complete the rotation of the baffle 220.

Figure 5:
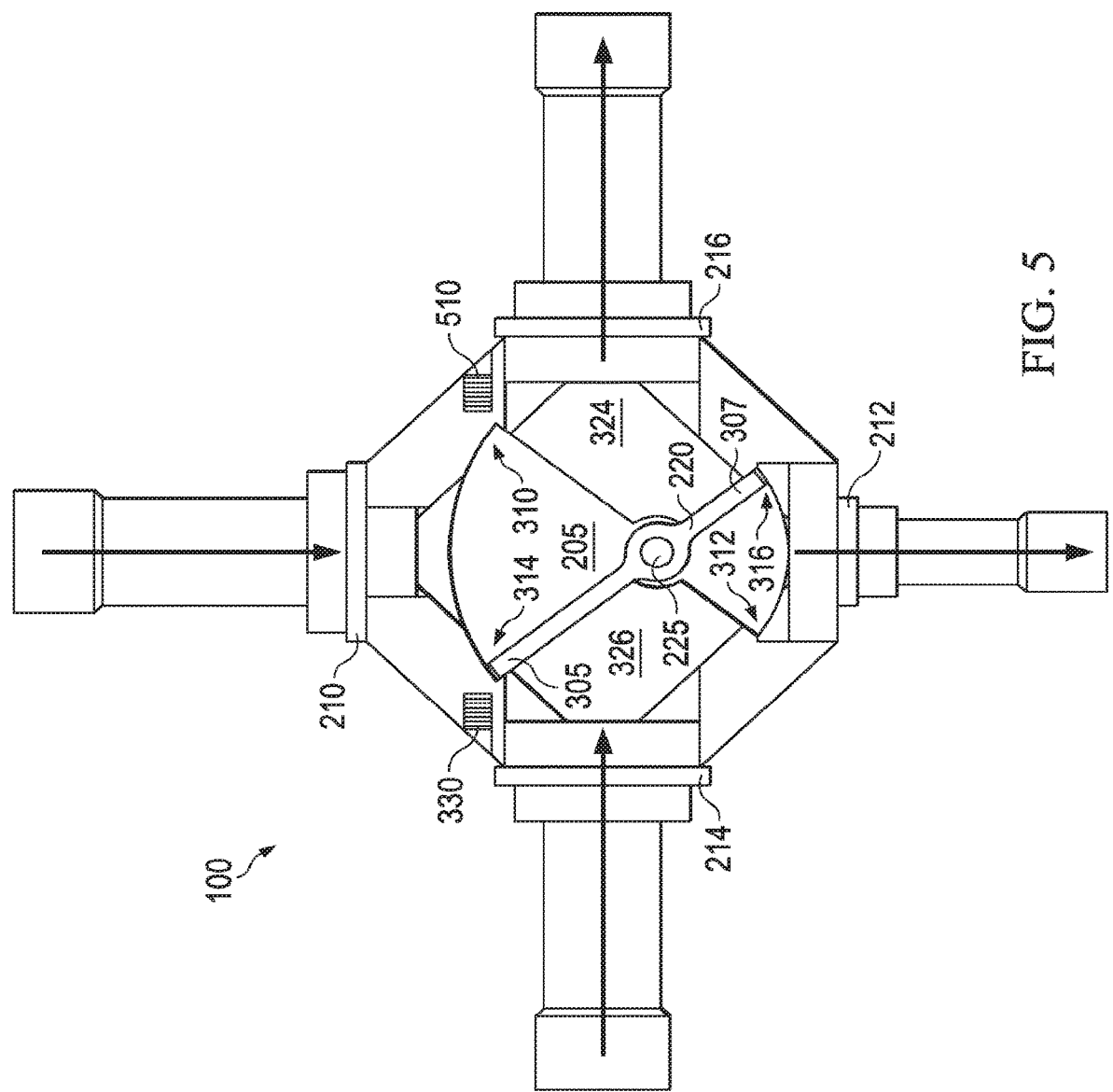
FIG. 5 shows a plan view of selected parts of another example embodiment of the reversing valve of the disclosure, similar to that depicted in FIG. 4, showing the baffle rotated counter-clockwise and depicting example refrigerant flow directions through the reversing valve for the embodiment.
Figure 6:
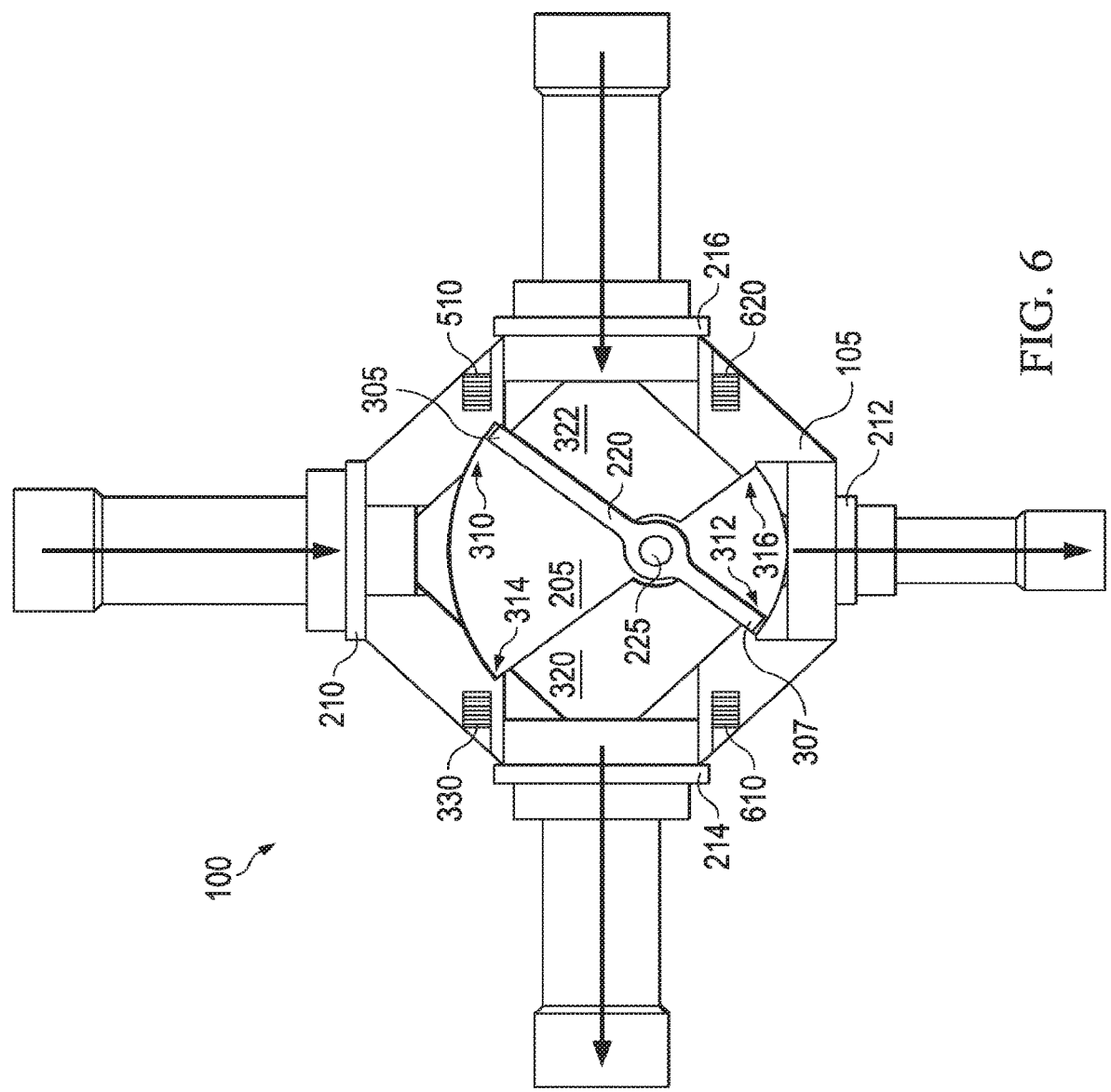
FIG. 6 shows a plan view of selected parts of another example embodiment of the reversing valve of the disclosure, similar to that depicted in FIG. 4, showing the baffle rotated clock wise and depicting example refrigerant flow directions through the reversing valve for the embodiment.

Some embodiments of the reversing valve comprise more than one electromagnet 330, and may or may not include the optional spring-loaded pivot point 225. FIGS. 5 and 6 show a plan views of selected portions of such example embodiments of the reversing valve 100, similar to that depicted in FIG. 4, showing the baffle 220 rotated counter-clockwise and clockwise, respectively.

FIGS. 5 and 6 further depict example refrigerant flow directions through the reversing valve for the embodiments, assuming the refrigerant pressure at the input port is greater than the pressure at the output port 212 and the pressures at the first and second reversing ports 214, 216 are in-between the pressures at the input and output ports 210, 212. For example, the input port 210 can be configured to be coupled to a refrigerant discharge line from a compressor, the output port 212 can be configured to be coupled to a refrigerant suction line of the compressor, and the first and second reversing ports 214, 216 are configured to be coupled to an outdoor heat exchange coil and an indoor heat exchange coil, respectively.

As illustrated in FIG. 5, in some embodiments, the electromagnet 330 is a first electromagnet configured to rotate the baffle 220 in one of the clockwise direction or the counter-clock wise direction, and the valve 100 further includes a second electromagnet 510 coupled to the valve body 105 and configured to rotate the baffle 220 in the opposite one of the clockwise direction or the counter-clock wise direction, when the voltage is applied to the second electromagnet 510 and the voltage is not applied to the first electromagnet 330. FIG. 5 shows the example embodiment valve 100 with the voltage applied to the first electromagnet 330 and not applied to the second electromagnet 510, resulting in the baffle 220 rotating counter-clockwise. In such a state, the refrigerant flow is directed from the input port 210 to the second reversing port 216, and the refrigerant flow is directed from the first reversing port 214 to the output port 212.

As illustrated in FIG. 6, some embodiments of the valve 100 include a plurality of electromagnets 330, 510, 610, 620 each coupled to the valve body 105. A first set of the electromagnets (e.g., electromagnets 330, 620) are configured to rotate the baffle 220 in one of the clockwise direction or the counter-clock wise direction (e.g., counter-clockwise, in this example) when the voltage is applied to the first set of electromagnets and the voltage is not applied to a second set of the electromagnets (e.g., electromagnets 510, 610). The second set of electromagnets are configured to rotate the baffle 220 in the opposite one of the clockwise direction or the counter-clock wise direction (e.g., clockwise, in this example) when the voltage is applied to the second set of electromagnets and the voltage is not applied to the first set electromagnets. As further illustrated in FIG. 6, in some embodiments the first set of electromagnets includes the electromagnet 330 and a second electromagnet 620 diagonally opposed to the electromagnet 330, and, the second set of electromagnets includes a third electromagnet 510 and a fourth electromagnet 620 diagonally opposed to the third electromagnet 510. In such a state, the refrigerant flow is directed from the input port 210 to the first reversing port 214, and the refrigerant flow is directed from the second reversing port 216 to the output port 212.

Figure 7:
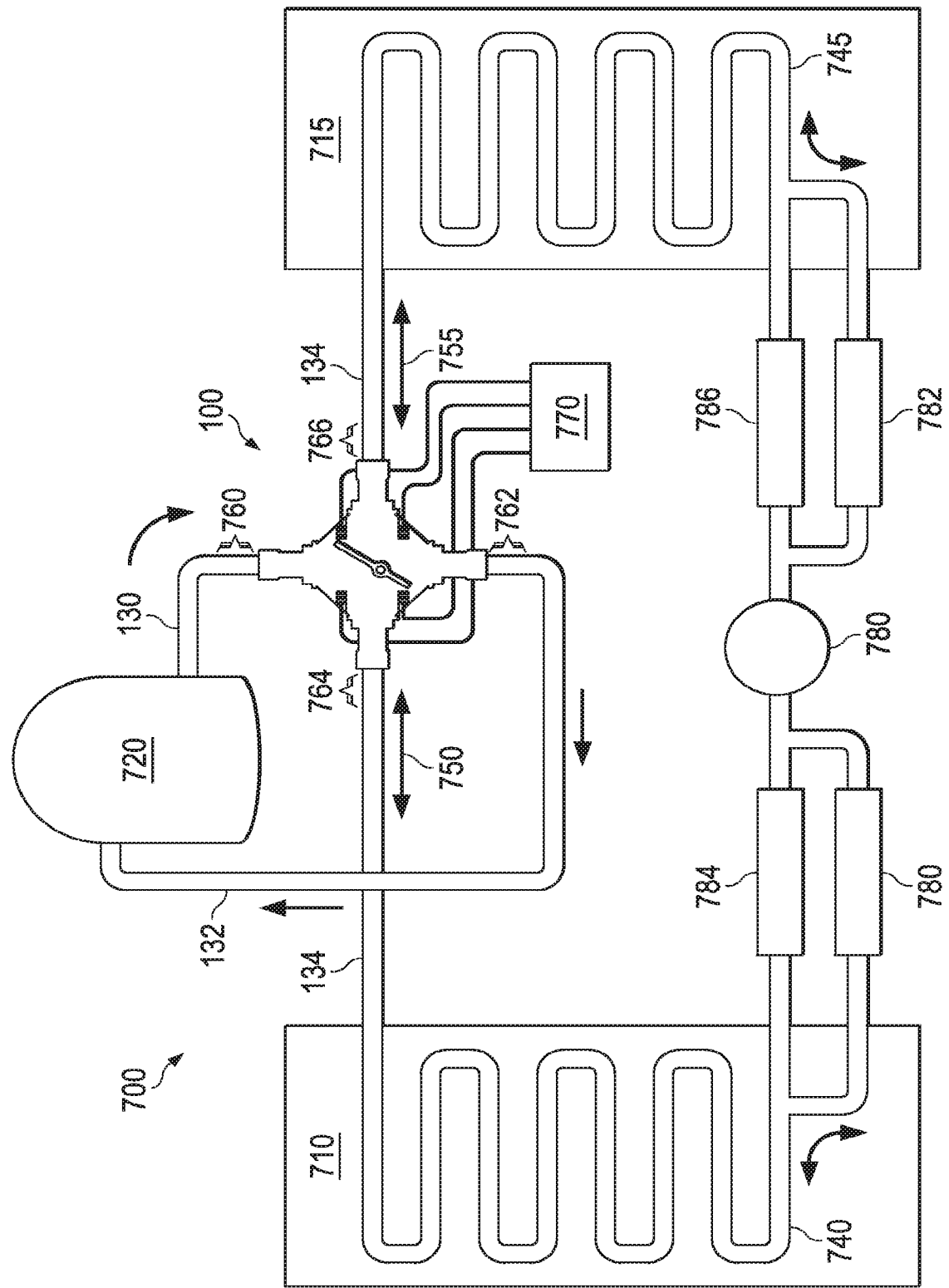
FIG. 7 show a block diagram of an example heat pump system of the disclosure.

Another embodiment of the disclosure is a heat pump system. FIG. 7 show a block diagram of an example heat pump system 700 of the disclosure. The heat pump system 700 can be configured as a space conditioning system for residential or commercial HVAC, or other space conditioning systems well known to those skilled in the art. As illustrated in FIG. 7, the system 700 comprises an outdoor heat exchanger 710, an indoor heat exchanger 715, and a compressor 720 configured to compress a refrigerant and configured to transfer the refrigerant to a discharge line 130 and to receive the refrigerant from a suction line 132 of the system 700. The system 700 further includes the reversing valve 100, which can include any of the embodiments of the reversing valve 100 discussed in the context of FIGS. 1-6. The input port 210 is coupled to the discharge line 130, the output port 212 is coupled to the suction line 132, the first reversing port 214 is coupled to a first transfer line 134 connected to the outdoor heat exchanger 710, and the second reversing port 216 is coupled to a second transfer line 136 connected the indoor heat exchanger 715.

For example, the first reversing port 214 can be coupled via first transfer line 134 to a heat exchange coil 740 of the outdoor heat exchanger 710. For example, the second reversing port 216 can be coupled via second transfer line 136 to a heat exchange coil 745 of the indoor heat exchanger 715. As discussed above the directions 750, 755 of refrigerant flow through the first and second reversing ports 214, 216 and coupled transfer lines 134, 136 can be revered by rotating the baffle 220. The reversing value 100 can be actuated to put the system 100 in a cooling mode by rotating the baffle 220 to direct refrigerant from the input port to the first reversing port 214. e.g., from the compressor discharge line 130 to the outdoor heat exchange 710. The reversing valve 100 can be actuated to put the system 100 in a heating mode by rotating the baffle 220 to direct refrigerant from the input port to the second reversing port 216, e.g., from the compressor discharge line 130 to the indoor heat exchange 715.

In some embodiments, such as illustrated in FIG. 7, to facilitate access to the individual ports and transfer lines coupled thereto, the input and output ports 210, 212 of the valve 100 are located on opposing sides 120, 122 of the valve body 105 (FIG. 1) and the first and second reversing ports 214, 216 are located on different opposing sides 124, 126 of the valve body 105. In some embodiments, again to facilitate access, in proximity to the reversing valve, portions of the transfer lines proximate to the valve extending away from the valve 100 are configured to have substantially perpendicular angles with respect to adjacent lines. For example, in some cases, a long dimension of a portion 760 of the discharge line 130 proximate the value 100 and a long dimension of a portion 762 of the suction line 132 proximate the valve 100 (e.g., line lengths within, about ½ foot, or within about 1 foot, in some case), are substantially parallel to each other. For example, in some cases, a long dimension of a portion 764 of the first transfer line 134 proximate the value 100 and a long dimension of a portion 766 the second transfer line 136 proximate the value 100 are substantially parallel to each other. In some cases the long dimension portions 764, 766 of the first and second transfer lines 134, 136 bisect the valve 100 along an axis 430 (FIG. 4) that is that is substantially perpendicular to an axis 420 that the long dimension portions 760, 762 of the discharge line 130 and suction line 132, bisect the valve 100 along.

Embodiments of the system 700 can further include other components to facilitate the system's operation. For instance, the system 100 can further include a controller 770 configured to cause the system 100 to switch between a cooling mode and a heating mode. For instance, the controller can be configured to actuate the reversing valve 100, e.g., by controlling the voltage applied to the one or more electromagnets 330. In some cases, the controller 760 is further configured to control the operation of other components of the system 700, such as the compressor 132. Embodiments of the controller 770 can include electronic, mechanical and electro-mechanical devices, such as microprocessors, microcontrollers, state machines, relays, transistors, power amplifiers or passive electronic devices.

For instance, embodiments of the system 100 can further include check valves 780, 782, Expansion values 784, 786 and filter/drier 788. One skilled in the art would be familiar with the operation and integration of these and other components to facilitate the system 100 to function efficiently as a heat pump.

Figure 8:
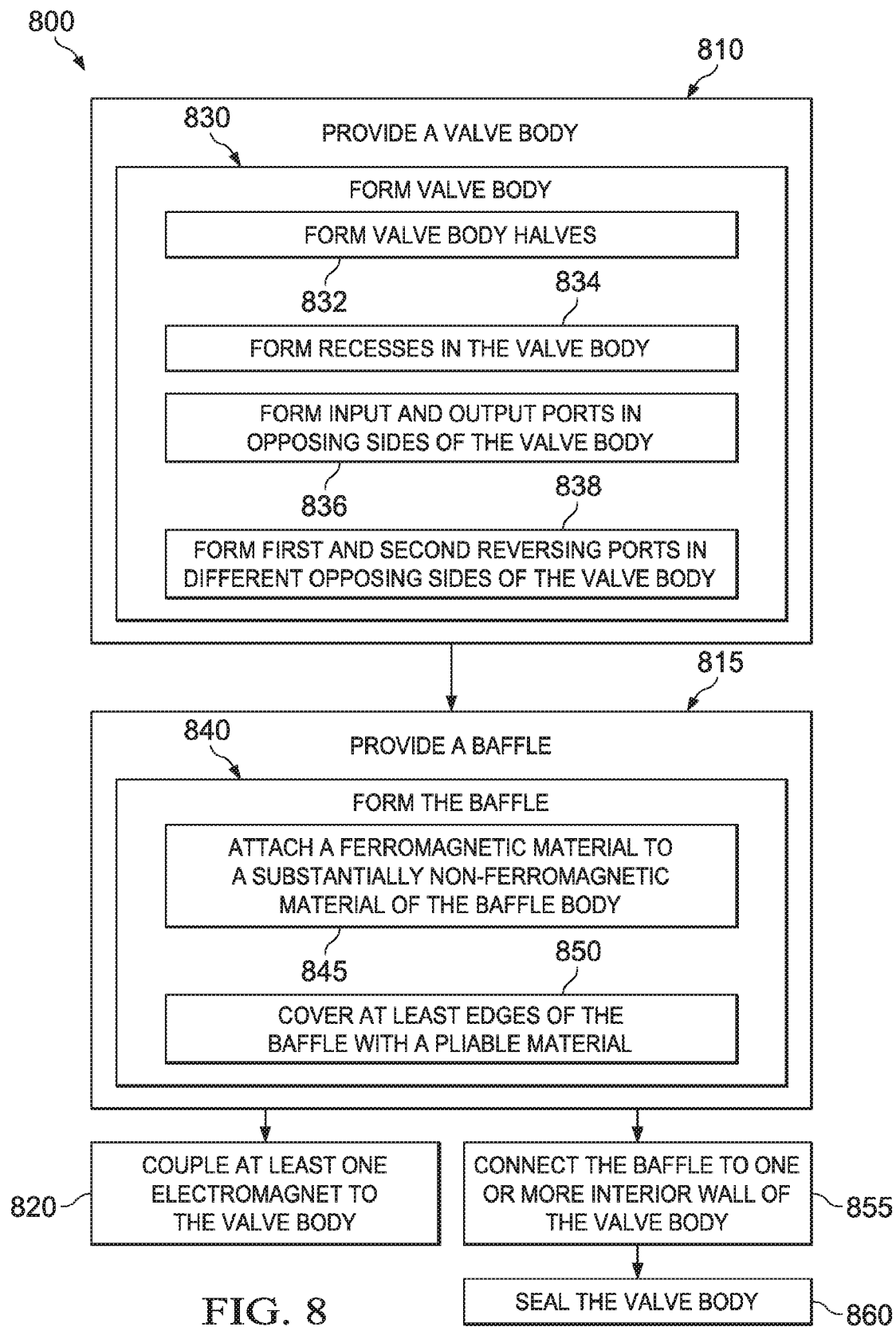
FIG. 8 presents a flow diagram of an example method of assembling a reversing valve disclosure, including any of the example embodiment reversing valve discussed in the context of FIGS. 1-7.

Another embodiment of the present disclosure is a method of manufacturing a reserving valve, such as any of the valves 100 discussed in the context of FIGS. 1-7. FIG. 8 presents a flow diagram of an example method 800 of manufacturing a reserving valve of the disclosure, including any of the example embodiment valve 100 discussed in the context of FIGS. 1-7.

With continuing reference to FIGS. 1-7 throughout, the example method 800 comprises a step 810 of providing a valve body 105. The body 105 has an internal cavity 205 therein and an input port 210, output port 212 and first and second reversing ports 214, 216. The input port 210, the output port 212 and the first and second reversing ports 214, 216 are all in fluid communication with the internal cavity 205.

The method 800 also comprises a step 815 of providing a baffle 220 configured to fit within the internal cavity 205 of the valve body 105. The baffle 220 is configured to rotate around a pivot point 225 within the internal cavity 205. The ends 305, 307 of the baffle 220 both contact interior walls 310, 312 of the value body 105 when the baffle 220 rotates about the pivot point 225 in a clockwise direction, thereby isolating the input port 210 and first reversing port 214 and volume 320 of the internal cavity 205 there-between, from the output port 212 and second reversing port 216 and different volume 322 of the internal cavity 205 there-between. The ends 305, 307 of the baffle 220 contact different interior walls 314, 316 of the value body 105 when the baffle 220 rotates about the pivot point 225 in a counter-clock wise direction, thereby isolating the input port 210 and the second reversing port 216 and second volume of the internal cavity 324 there-between from the output port 212 and the first reversing port 214 and second different volume 326 of the internal cavity 205 there-between.

The method 800 further comprises a step 820 of coupling at least one electromagnet 330 to the valve body 105. The electromagnet 330 is configured to cause the baffle 202 to rotate in one of the clockwise direction or counter-clock wise direction when a voltage is applied to the electromagnet 220.

In some embodiments, providing the valve body 105 in step 810 can include a step 830 of forming the valve body 105. For instance, forming the 105 in step 830 can include forming (step 832) two separate halves 140, 142 of the body 105. For instance, a metal piece such as copper, brass, aluminum can be bent, machined or molded, as part of step 830, to form the valve body halves 140, 142. In some cases, the forming step 830 includes (step 834) forming recesses 230 in one or more the interior walls 310-316, the recessed portions 230 of the walls 310-316 configured to allow portions of major surfaces 335 of the baffle 220 near the ends 305, 307 of the baffle 220 to contact the recessed portions 230.

In some embodiments, the forming the body 105 in step 830 can include a step 836 of forming the input and output ports 210, 212 on opposing sides 120, 122 of the valve body 105, and, a step 838 of forming the first and second reversing ports 214, 216 on different opposing sides 124, 126 of the valve body 105.

In some embodiments the step 815 of providing the baffle 220 can further include a step 840 of forming the baffle 220. Forming the baffle 220 can include bending, machining or molding a material, such as a ferromagnetic metal or a non ferromagnetic material, to conform to the surface contours of the internal cavity 205. For example, the baffle 220 can be formed in step 840 such that ends 305, 307 of the baffle 240, in particular the edges 340, closely match and conform to the surface contours of the internal cavity with a gap distance 345 between outer edges of the baffle and the interior walls is about ⅛ inch or less, and in some cases, about ¹⁄₁₆ inch or less. In cases where the baffle 220 is substantially composed of a non-ferromagnetic material, forming the baffle 220 (step 840) can further include a step 845 of attached a ferromagnetic material 360 to the substantially non-ferromagnetic material of the baffle body 365. In some embodiments, forming the baffle 220 (step 840) can further include a step 850 covering at least edges 340 of the baffle 220 (and in some cases the entire baffle 220) with a pliable material 350, such that when connected to the pivot point 225 the edge 340 can contact, but still slide, along the interior walls 310-316.

Some embodiments of the method 800 can further include a step 855 of connecting the baffle 220 to one or more interior walls (e.g., a top or bottom wall) at the pivot point 225, and step 860 of sealing the valve body (e.g., by welding or gluing the two halves 140, 142 of the body 105 together) with the baffle 220 therein.

Those skilled in the art to which this application relates will appreciate that other and further additions, deletions, substitutions and modifications may be made to the described embodiments.

What is claimed is:

1. A reversing valve, comprising:
   a valve body that includes:
   an internal cavity therein;
   an input port;
   output port;
   a first reversing port;
   a second reversing port, wherein the input port, the output port, the first reversing port and the second reversing port are all in fluid communication with the internal cavity; and
   a baffle located within the internal cavity, wherein:
   the baffle is configured to rotate around a pivot point within the internal cavity, wherein ends of the baffle contact interior walls of the valve body when the baffle rotates about the pivot point in a clockwise direction; and the ends of the baffle contact different interior walls of the valve body when the baffle rotates about the pivot point in a counter-clock wise direction;

at least one electromagnet coupled to the valve body;

responsive to a voltage being applied to the at least one electromagnet, the at least one electromagnet rotates the baffle in a first direction;

the pivot point is connected to a torsion spring concentric to the pivot point; and the torsion spring is configured to rotate the baffle in a direction opposite the first direction.

2. The reversing valve of claim 1, wherein the input port and the output port are located opposite one another on the valve body.

3. The reversing valve of claim 1, wherein at least one interior wall includes recesses, each recess is configured such that a portion of a major surface of the baffle near one of the ends of the baffle contacts the recess to stop the baffle rotation and forms a fluid seal between the baffle and the at least one interior wall.

4. The reversing valve of claim 1, wherein a gap distance between outer edges of the baffle and the interior walls is about ⅛ inch or less.

5. The reversing valve of claim 1, wherein at least an outer edge of the baffle is covered with a pliable material that contacts the interior walls.

6. The reversing valve of claim 1, wherein the internal cavity of the valve body is covered with a pliable material.

7. The reversing valve of claim 1, wherein the baffle is substantially composed of a ferromagnetic material.

8. The reversing valve of claim 1, wherein the baffle is substantially composed of a non-ferromagnetic material and further includes a ferromagnetic material attached thereto.

9. The reversing valve of claim 1, the first reversing port and the second reversing port are located opposite one another on the valve body.

10. The reversing valve of claim 1, wherein the pivot point is substantially offset from a center of the internal cavity along a central axis along the input port and the output port.

11. The reversing valve of claim 1, wherein:

the at least one electromagnet comprises a first electromagnet and a second electromagnet;

the second electromagnet is coupled to the valve body; and responsive to the voltage being applied to the second electromagnet and no voltage being applied to the first electromagnet, the second electromagnet rotates the baffle in a direction opposite the first direction.

12. The reversing valve of claim 1, further including a plurality of electromagnets each coupled to the valve body, wherein a first set of the electromagnets are configured to rotate the baffle in the first direction when the voltage is applied to the first set of the electromagnets and no voltage is applied to a second set of the electromagnets, and the second set of the electromagnets are configured to rotate the baffle in the direction opposite the first direction when the voltage is applied to the second set of the electromagnets and no voltage is applied to the first set electromagnets.

13. The reversing valve of claim 12, wherein:

the first set of electromagnets includes a first electromagnet and a second electromagnet diagonally opposed to the first electromagnet; and the second set of electromagnets includes a third electromagnet and a fourth electromagnet diagonally opposed to the third electromagnet.

14. The reversing valve of claim 1, wherein:

the input port is configured to be coupled to a refrigerant discharge line from a compressor;

the output port is configured to be coupled to a refrigerant suction line of the compressor; and the first reversing port and the second reversing port are configured to be coupled to an indoor heat exchange coil and an outdoor heat exchange coil, respectively.

* * * * *